(No Model.) 3 Sheets—Sheet 1.

C. TERRELL.
STEERING APPARATUS.

No. 370,828. Patented Oct. 4, 1887.

Witnesses:
Frank T. Smart
Jeremiah Ahern

Inventor:
Charles Terrell

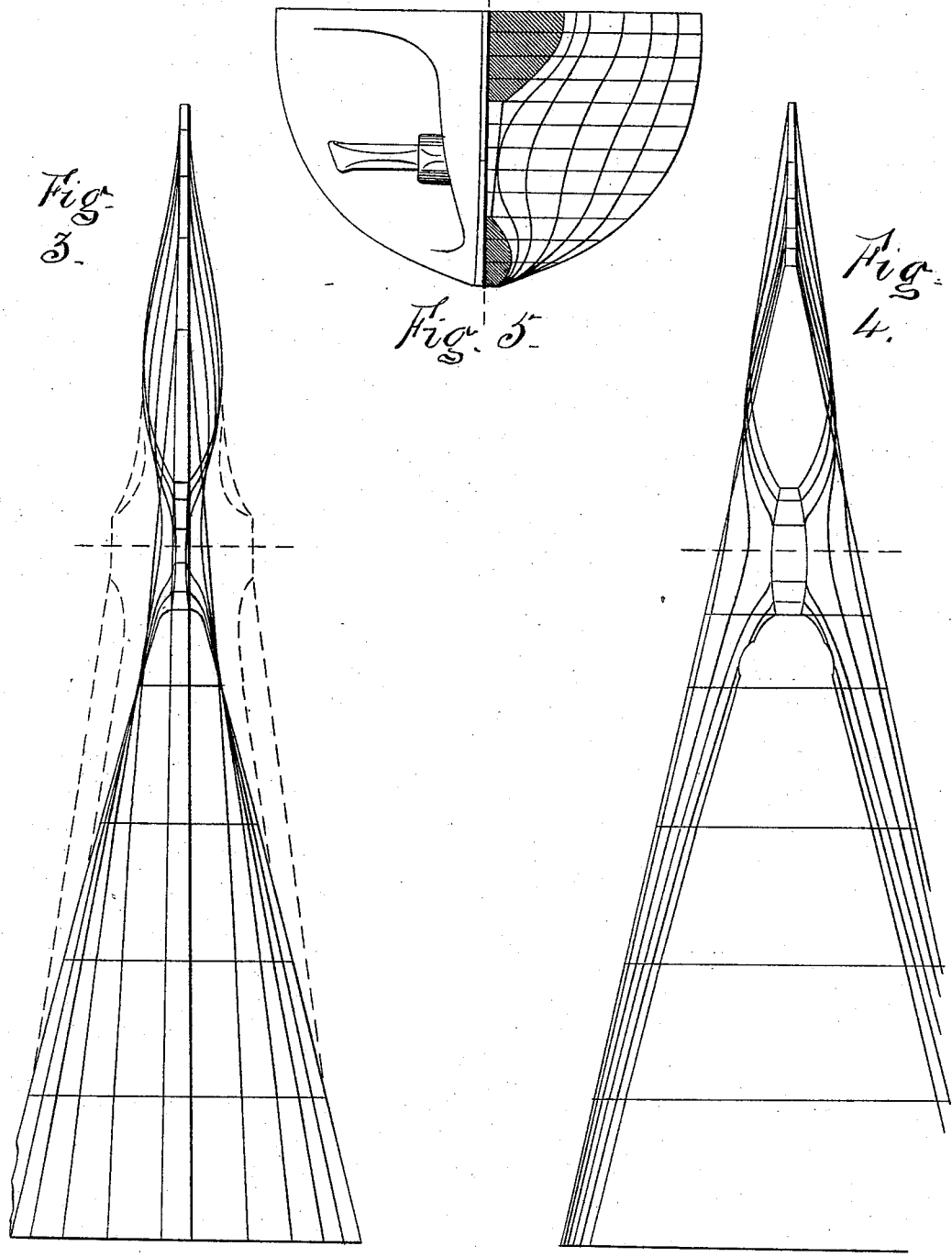

UNITED STATES PATENT OFFICE.

CHARLES TERRELL, OF WASHINGTON, DISTRICT OF COLUMBIA.

STEERING APPARATUS.

SPECIFICATION forming part of Letters Patent No. 370,828, dated October 4, 1887.

Application filed December 2, 1886. Serial No. 220,549. (No model.)

*To all whom it may concern:*

Be it known that I, CHARLES TERRELL, a citizen of the United States, residing in the city of Washington, District of Columbia, have invented an Improved Steering Apparatus, of which the following is a specification, reference being had to the annexed drawings, forming part of same.

This invention relates to the steering and controlling of vessels for the perfecting of steam-propulsion.

The object of the invention is most advantageously to apply and to bring into action greater power in steering, and to gain more perfect control of steamers and steam-propulsion, the steering being effected with increased facility, power, certainty, and rapidity, and perfect control being possessed whether the vessel be under the highest speeds or without headway whatever, either with or without the assistance or existence of the ordinary steering apparatus at the stern; also, to make possible a much greater speed by relieving the driving-screw of hindrances to an increase in diameter, the first essential in attaining higher speeds.

With these objects in view, the invention resides, essentially, in a marine screw in a screw-aperture in the bow, (i. e., in the forward dead-wood or entrance-body of a vessel,) mounted upon fixed bearings, with its axis horizontal and at right angles with the keel, having suitable engine-power applied under such control as to permit the steersman to revolve the screw in either direction desired that the vessel's head may be turned to starboard or to port.

I have illustrated my invention by the accompanying drawings, in which—

Figure 1:
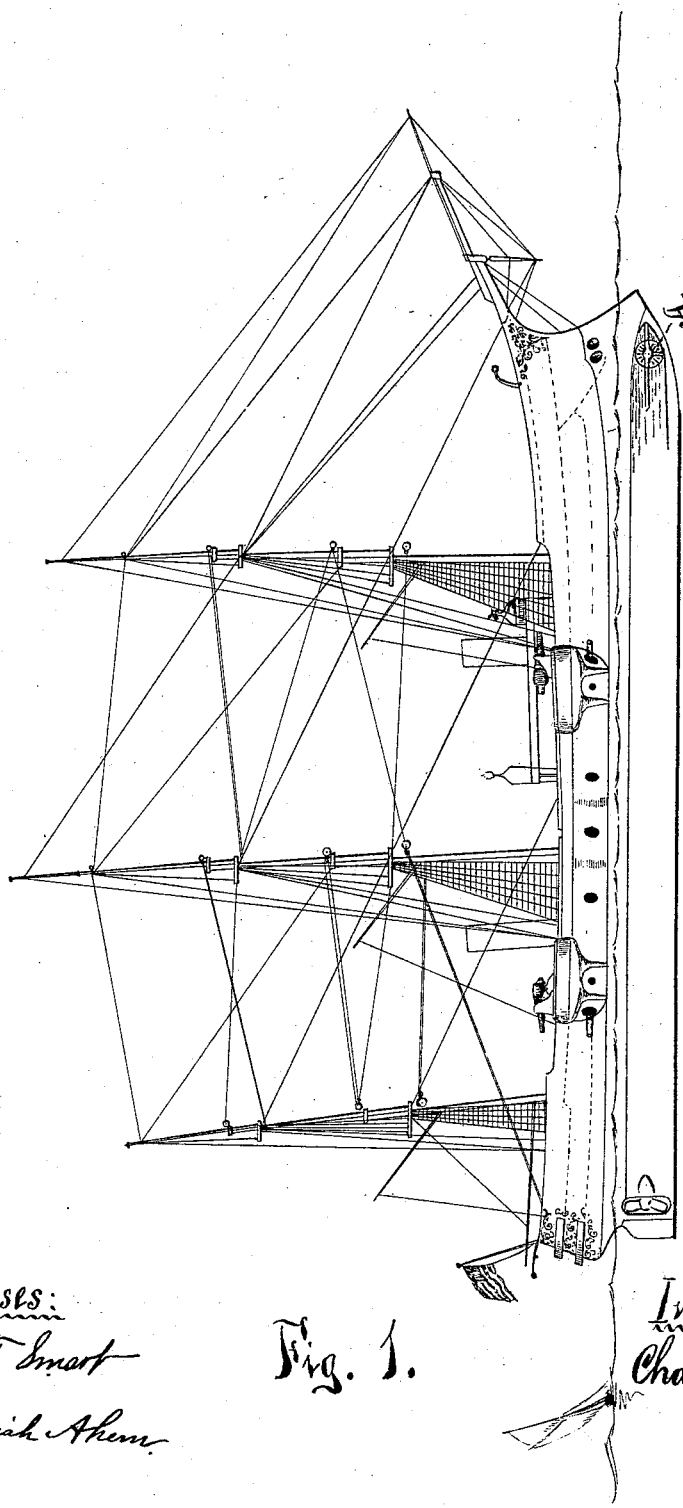
Figure 2:
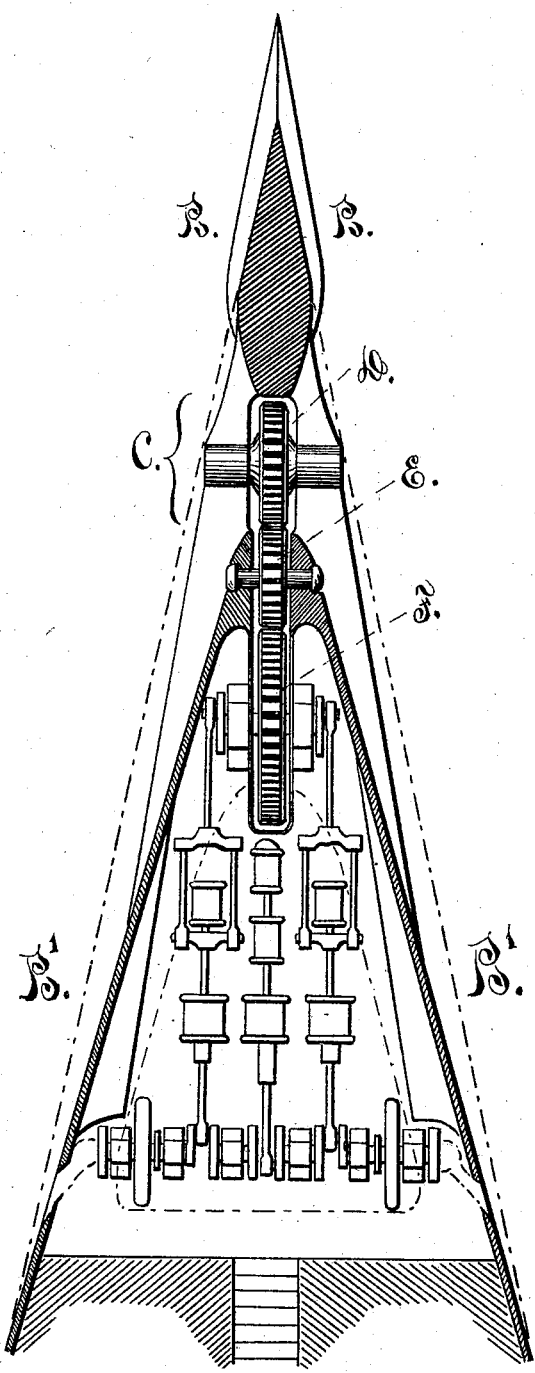

Figure 1 is a sheer outline of a man-of-war, showing the position of the pilot-screw; and Fig. 2, a horizontal section of the bow, showing the form of the screw-aperture, &c. Fig. 3 represents the water-lines of the entrance-body of a vessel, below the plane of Fig. 2. Fig. 4 represents the water-lines of the entrance-body above the plane of Fig. 2, and Fig. 5 represents the half-body view and half-body plan.

The development in the length, size, and speed of vessels during the past generation, due to the introduction of steam-propulsion, has far exceeded the very slight advance made in the improvement of steering-apparatus. It is therefore to be desired that the steering power applied to and controlling steamers be made commensurate with the driving-power.

Various methods have been suggested and patented to secure additional steering-power by means of tubes discharging water, by rudder-screws, and by systems of transverse water-ways, and in the case of the English patent of 1878 (Matthews's) the forward end is recognized as the point to apply the steering-screw.

An analogous development is demanded for the perfecting of steam-propulsion, and I therefore aim to perfect and to introduce the pilot-screw and fully to develop bow control.

In the drawings, A, Fig. 1, marks the position of the pilot-screw in the forward dead-wood.

B B and B' B', Fig. 2, are "tandem-bow" water-lines, showing by a horizontal section the form of the screw-aperture C, which I propose to introduce. This, it will be seen, is flared externally to the utmost, and the transverse tube heretofore suggested by patentees is avoided. Any steering-screw located therein can thus be supplied with solid water as free from eddies as possible, and its power fully developed.

D in Fig. 2 is a pilot-screw of many blades, and a cogged periphery within such a tandem-bow screw-aperture, mounted on fixed bearings, with its axis horizontal and athwartship.

F, Fig. 2, is a driving cog-wheel of disk construction driven by a reversible engine under the control of the steersman and transmitting motion to the pilot-screw.

E, Fig. 2, is an anti-friction cog-wheel with lignum-vitæ teeth, which may be interposed between the driving-wheel and steering-screw to diminish the wear of the metal cogs.

What I claim in this application as new and of my invention, and desire to secure by Letters Patent, is—

As a means for steering and controlling a vessel, the forward dead-wood or entrance body with a screw aperture or opening therethrough, the form of said opening giving tandem-bow water-lines and constituting a forward and secondary bow, the forward bow having a clean run, and a marine-screw steering-screw located in said aperture on a horizontal axis at right angles to the keel, whereby the screw so located is supplied with solid water, for the purposes hereinbefore specified.

CHARLES TERRELL.

Witnesses:
JOHN P. O'NEILL,
WM. G. TERRELL.